July 3, 1923.

E. V. HARTFORD

MOTOR AND MEANS FOR CONTROLLING THE SAME

Filed July 24, 1918    2 Sheets-Sheet 1

1,461,001

INVENTOR
Edward V. Hartford
BY
Clifford E. Dunn
ATTORNEY

July 3, 1923.
E. V. HARTFORD
1,461,001
MOTOR AND MEANS FOR CONTROLLING THE SAME
Filed July 24, 1918    2 Sheets-Sheet 2
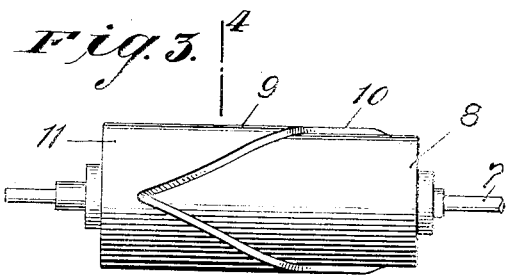
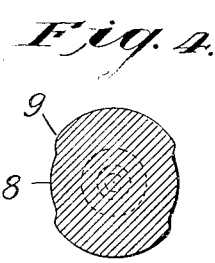
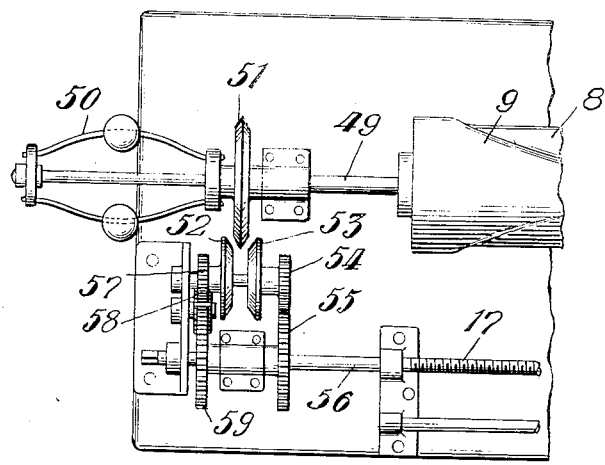
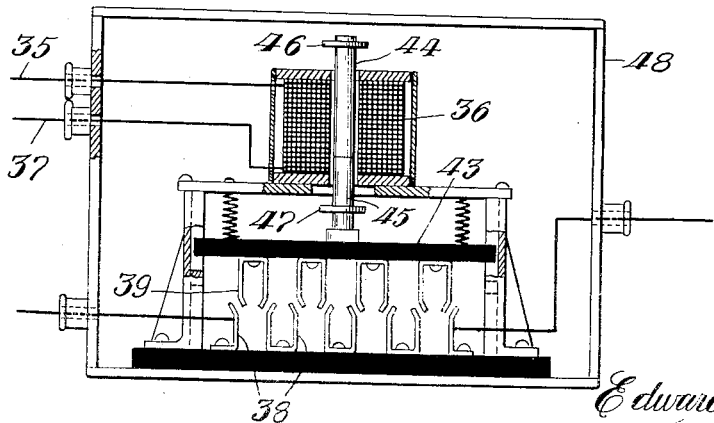
INVENTOR
Edward V. Hartford
BY
ATTORNEY Patented July 3, 1923.

1,461,001

UNITED STATES PATENT OFFICE.

EDWARD VASSALLO HARTFORD, OF DEAL, NEW JERSEY, HENRIETTA POLLITZER HARTFORD, ADMINISTRATRIX OF SAID EDWARD V. HARTFORD, DECEASED.

MOTOR AND MEANS FOR CONTROLLING THE SAME.

Application filed July 24, 1918. Serial No. 246,487.

*To all whom it may concern:*

Be it known that I, EDWARD VASSALLO HARTFORD, a citizen of the United States, residing at Deal, in the county of Monmouth and State of New Jersey, have invented certain new and useful Improvements in Motors and Means for Controlling the Same, which invention is fully set forth in the following specification, reference being had to the accompanying sheets of drawings.

My invention relates to motors and means for controlling the same. More specifically my invention relates to electric motors and means for controlling such motors.

One of the objects of my invention is to provide a motor with means whereby the speed may be controlled at the will of the operator by very simple means.

A further object of my invention is to arrange this motor controlling means so that it may be operated from the motor.

A further object of my invention is to provide means for varying the speed of the motor uniformly as distinguished by the usual means which vary the speed of the motor by various steps making sudden changes from point to point in the speed of the motor.

A further object of my invention is to control the speed of the motor without the use of resistances or other means consuming a material amount of energy, which would otherwise be supplied to the motor.

A further object of my invention is to provide means whereby energy may be intermittently supplied to the motor and yet the motor may rotate substantially uniformly for any given point in its adjustment.

A further object of my invention is to provide a governor for an electric motor which may control the speed of the motor and maintain such speed at a substantially constant value irrespective of the load placed upon the motor.

A few of the many possible forms which my invention may take is shown in the accompanying drawings, in which—

Fig. 3 is a detail of the cam drum of the controlling means.

Fig. 4 is a section of Fig. 3 on the line 4—4.

Fig. 5 is a sectional view of the electromagnetically operated switch.

Fig. 6 is a view of a further form of my invention in which the controlling means is automatically adjusted.

Figures 1, 2:
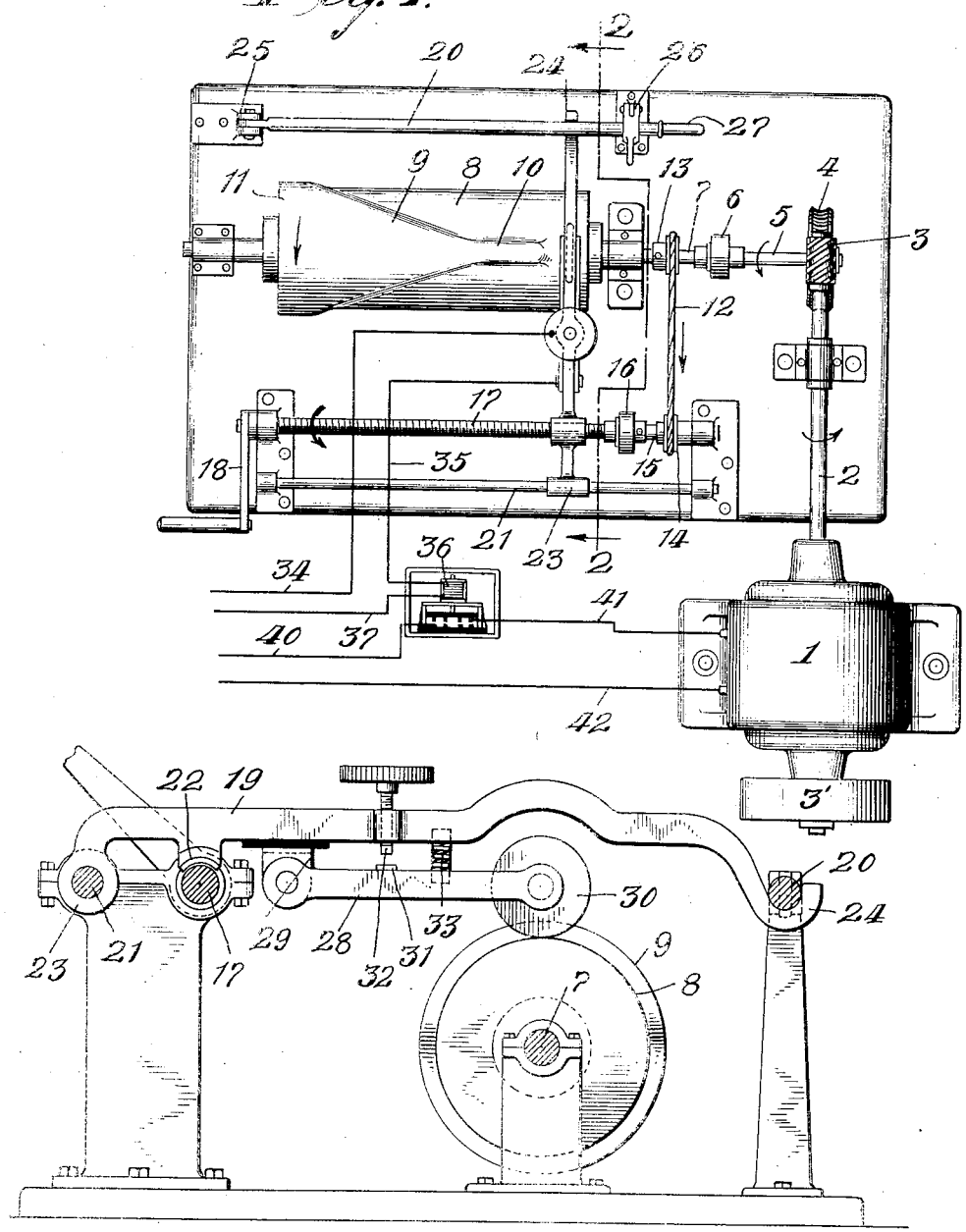
Fig. 1 is a general plan view of the motor and controlling means, such controlling means in this instance being manually adjusted.
Fig. 2 is a section of the line 2—2 of Fig. 1 looking in the direction of the arrows.

Referring now to Fig. 1 of the drawings it will be seen that the electric motor is indicated by the reference numeral 1. It is to be understood that such motor, though preferably of the series type may be either a series, shunt, compound or differential motor. This motor has mounted upon the shaft 2 thereof a fly wheel 3'. From the shaft 2 power may be taken to drive the load for which the motor is intended. The connecting means such as the pinion or pulley, however, is omitted from the drawing. Mounted upon the shaft 2 is a worm 3, which meshes with the worm wheel 4 which is mounted upon a shaft 5 at right angles to the motor shaft 2.

This motor 1, it is understood is preferably a high speed motor and by means of the reduction gearing comprising the worm and worm wheel 3 and 4 respectively, the shaft 5 may be rotated at a very much reduced speed. For example, gear reductions of 1 to 25 and 1 to 50 have been contemplated.

The shaft 5 has mounted thereon a ratchet or over-running clutch 6 which connects with the shaft 7. The shaft 7 carries a cam drum 8 which has the cam surface 9 in the form of a substantial V for the major portion thereof and one end near the apex has an elongated narrow portion 10. At the other end, that is to say, near the base of this V shaped cam the raised portion is continuous all the way around the cylinder 8, as shown at 11. This is clearly shown in Figs. 3 and 4.

Belted to the shaft 7 by means of the belt 12 and pulleys 13 and 14 is a second shaft 15, which has also a ratchet or over-running clutch 16 which connects such shaft 15 with a threaded rod or shaft 17. This threaded rod 17 carries at its other end a crank 18, which is for the purpose of allowing the rod 17 to be manually rotated.

A carrier 19 is adapted to be moved along the guides 20 and 21 by means of a half nut 22 which meshes with the threads upon the shaft or rod 17. A comparatively large bearing portion or sleeve is shown at 23 which is a portion of this carrier and is adapted to slide along the rod 21. The other end of this carrier has a hooked shaped portion 24 which is adapted to be hooked under the rod 20 and slide along such rod. The rod 21 is fastened at both ends and constitutes the guide rod. The rod 20, however, is pivoted at one end, as shown at 25, and is adapted to be received in the spring or latch member 26 at the other end, or to be moved therefrom when released by means of the handle 27, and is then adapted to pivot at the point 25 and to be rocked upwardly.

It will now be seen that upon rotation of the crank 18 the carrier may be moved up or down these guide rods 20 and 21. This carrier 19 carries an insulated pivoted lever 28, which is mounted at its pivoted end upon the block or supporting member 29 which is suitably insulated from the carrier 19. The other end of this lever 28 carries a roller 30 which is adapted to ride upon the surface 8 of the cam drum and to travel over the cam portion thereof and thereby oscillate this pivoted lever 28. It will be observed that this pivoted lever 28 has a contact 31 mounted thereon which is adapted to co-operate with an adjustable contact 32 which is carried by the carrier 19. A suitable spring such as shown at 33, for example, may be used to normally press this pivoted lever 28 downwardly. The spring, however, in certain cases may be omitted.

From the description, as thus far given, it will be seen that upon the operation of the crank 18, the carrier 19 may be moved along the cam drum 8 and that the cam drum 8 will be rotated by means of the belt 12 and pulleys 13 and 14, inasmuch as the ratchet or over-running clutch 16 locks when it is driven from the crank 18. The ratchet or over-running clutch 6 releases and the shaft 5 remains idle in the position shown in Fig. 1, when the crank 18 is rotated in the direction indicated, thereby driving the drum 8 in the direction also indicated. If, however, the motor is driving and rotates the shaft 5 in the direction indicated, the ratchet or over-running clutch 6 will transmit the power from shaft 5 to shaft 7 and thereby continuously rotate the cam drum 8. However, the ratchet or overrunning clutch 16 will then release and allow the shaft 15 to freely rotate without rotating the shaft 17.

The electrical circuits which are controlled through the medium of the cam, the pivoted lever 28 and the co-operating contacts 31 and 32 will now be described.

From suitable mains a wire 34 leads to the contact 32, which is in the instance shown also connected to the frame work of the machine, although it is obvious that such contact 32 may be suitably insulated from the frame of the machine. From the other contact 31 a wire 35 leads to an electromagnetically operated switch and is connected at one side of the electro-magnet 36. The other side of the electro-magnet is connected by means of a wire 37 to the other side of the mains. This electro-magnet through the medium of the contacts 38 and the co-operating contacts 39 opens or closes the motor circuit, which includes a wire 40 leading from the same or other mains from which the current energizing the electro-magnetic switch is supplied. A second wire 41 leads from the switch to the motor and a return wire 42 leads from the motor to the other side of the mains. It is, of course, understood that in both circuits above described suitable switches or fuses may be placed.

Upon reference to Fig. 5 a detail of the electro-magnetic switch is shown. This switch includes the contacts 38 and 39, as previously described, which are adapted to cause a multi-point break in the electrical circuit. The contacts 39 it will be seen are carried by a movable insulating cross head 43 which is controlled in its motion by means of a plunger of the magnet 36. This magnet 36 may be a conventional iron clad magnet and the plunger may be composed of a magnetic material, as shown at 44, and a non-magnetic material as shown at 45. The extreme limits of stroke of this plunger are determined by means of suitable collars 46 and 47, as shown. It will thus be seen that when the magnet 36 is energized the plunger in drawn downwardly and forces the contacts 39 into engagement with the contacts 38 and thereby closes the motor circuit. A suitable spring retracts the cross head 43 when the current is shut off from the magnet 36. It will be noted that this apparatus is carried in a casing 48 and is adapted to operate in oil, so as to make a very quick and sure break.

The operation of this device will now be given.

Upon rotation of the crank 18, as shown in Fig. 1, the drum 8 is rotated and also the carrier 19 is caused to travel in a left hand direction in the figures shown. This causes the roller 30 to engage the cam surface of the drum 8 and thereby oscillate the lever 28 and cause the contacts 31 and 32 to come into engagement with each other. This it will be seen, causes an intermittent closing of the circuit energizing the electro-magnetic switch, which in turn causes an intermittent closing of the motor circuit. This causes the motor to slowly rotate and thereby slowly drives the shaft 5, and when the speed of such shaft 5 exceeds the speed of the shaft 7, the over-running or ratchet clutch 6 causes such shaft 7 to be driven by the shaft 5. Thereupon the over-running or ratchet clutch 16 releases and allows the shaft 15 to turn idly without rotating the shaft 17. The fly wheel 3', it will be seen, absorbs the energy during the time the motor circuit is closed and returns such energy to the system to rotate the motor and thereby carry the drum 8 over to such position that the succeeding cam surface is presented and a succeeding impulse thereby given to the motor. This insures a continuous substantially uniform rotation of the motor at a very low speed, and it will be noted that this is secured without the addition of resistances in the motor circuit, as is now usual in starting rheostats and controlling resistances. Upon the continued rotation of the crank 18 the roller 30 is caused to travel longitudinally along the extended cam portion 10 and this extended portion is intended to allow the motor to come up to its lowest speed before the roller 30 strikes the V shaped or gradually increasing cam surface 9. When the roller 30 begins to travel along this V shaped portion 9 the impulses are of longer duration and the motor, therefore, is supplied with more energy than it formerly was. Such energy, if not used, is stored in the fly wheel 3'. Inasmuch as this cam surface increases at a uniform rate, it will readily be seen that the variations in speed of the motor may be made at a smooth or uniform rate without sudden changes, as in the case of the usual rheostats or controllers. When the roller 30 arrives at the continuous portion 11, the motor is then running at its maximum speed.

It will thus be seen that I have provided a means for controlling the speed of a motor without waste of energy and have also provided, through the medium of the fly wheel 3', for the storing of reserve energy in the rapidly rotating fly wheel.

It will further be noted that the motor operates at its usual efficiency at each of the speeds at which it may be set, and that the system, as a whole, is substantially of this efficiency, inasmuch as no resistances have been inserted in the motor circuit. That is to say, as this may be stated in another form, that I have provided a device by means of which an electric motor may be operated at any desired speed and in a very efficient manner, as distinguished from the present modes of the controlling of speeds of electric motors.

I contemplate using this scheme for controlling the speed of electric motors of all sizes from small sized high speed motors to large motors of the type adapted to run an electric locomotive, for example.

In certain cases it may be desirable to have a motor of a substantially uniform speed at all loads and yet have a motor of enormous starting torque, as given for example by a series motor. This constant speed control, I have secured by means of the device shown in Fig. 6 which is a further form which my apparatus may take. In this, as in the other cases, the drum is indicated at 8, the cam shaft portion at 9 and the continuation of the shaft 7 at 49. This shaft 49 carries a governor 50 which is adapted to operate the friction wheel 51 in a left hand direction with an increase of speed and in a right hand direction with a decrease in speed. This friction wheel 51 is adapted to co-operate with the other friction wheels 52 and 53. For example, friction wheel 53 turns loosely upon the same shaft as friction wheel 52 and such arrangement is found convenient. The friction wheel 53 is rigidly connected to pinion 54 which meshes with the gear 55, which is rigidly fastened upon the shaft 56 which is a continuation of the threaded shaft 17. Friction wheel 52 has rigidly connected thereto a pinion 57 which meshes with the idler 58, which in turn meshes with a gear 59, which is rigidly fastened upon the shaft 56.

In this case the roller 30 is designed to be placed about one half way up the V shaped portion 9 of the cam surface and the motor is in this adjustment delivering full power. This may be secured by having the motor wound for one half the voltage of the mains to which it is to be connected. It will thus be seen that during normal operation when the motor is delivering full power it is connected to the mains one half of the time. If for any reason the load is increased the speed will drop slightly and will cause the friction wheel 51 to engage the friction wheel 53. This, through the medium of the gears and threaded shaft, causes the carrier 19 to move in a left hand direction and increase the period during which the motor is connected directly to the mains. This causes the motor to receive more energy and brings the motor back to its former speed. When the load decreases the governor 50 due to the resulting increase in speed causes the friction wheel 51 to engage the friction wheel 52 and causes the roller 30 to travel in a right hand direction, or down the cam portion 9. This brings the motor down to normal speed.

It is to be understood that a hand crank may be placed upon the shaft 56, for example, upon the extreme left hand portion thereof, whereby the motor may be started by manual operation of the controlling means.

This device is very well adapted to a series motor operating under very heavy loads, as for example in electric locomotives or electric hoists where the motor is designed to start under very heavy loads requiring high starting torque.

It will be seen from the last described form of my invention that I have provided a controlling means for a motor, which may be of the series type, which causes the motor to act in a manner which gives it entirely different characteristics from the inherent characteristics of a series motor. It is well known that a motor in driving a car uphill slows down and thereby takes additional current from the mains. This additional current, however, is only continuously taken while the motor is operating at less than normal speed. With my device, however, as soon as the motor slows down even very slightly through the action of the governor, the motor is caused to draw additional energy from the mains and its speed is brought back to normal, although it is operating under an additional load over and above the normal load.

It will further be seen that I have provided a means for gradually varying the motor speed through a very wide range without any sudden changes in speed from point to point in such range.

It is to be understood that the above detailed description and drawings are to be interpreted in an illustrative sense and not in a limited sense, as the invention is to be limited only as set forth in the following claims.

I claim:—

1. The combination with a series electric motor and means operated thereby for intermittently supplying energy to said motor, said means comprising a cam element and contacts operated thereby of means for varying the period of energization, and a speed-responsive means controlling the last mentioned means whereby constant speed at varying loads is maintained.

2. The combination of an electric motor, a rotatably mounted tapered cam member operated thereby, means co-operating with said tapered cam to control the supply of energy to said motor, and means for moving said last mentioned means along said tapered cam member, said means rotating said cam independent of the motor.

3. The combination of an electric motor, a rotatably mounted tapered cam, operated thereby, contact closing means operated by said cam means, and means for either automatically moving said contact closing means along said tapered cam means in response to the speed of the motor or for manually moving said circuit closing means along said cam surface irrespective of the motor speed, whereby the period of closure of said contacts may be varied.

4. The combination with an electric motor and a drum having a cam surface rotated by the motor, means independent of the motor speed co-operating with said cam surface for intermittently controlling the motor circuit, and means for advancing said last mentioned means along said cam surface.

5. In combination, an electric motor, a drum of general cylindrical shape, one portion of the surface of the drum being at a slightly lesser radius than the remainder of the surface whereby a cylindrical cam is provided, means for rotating said drum by said motor, a switch operable by the rotation of the cylindrical cam, said switch controlling the energy supply of the motor, and means for adjusting the switch along the cam.

6. In combination, an electric motor, a drum of general cylindrical shape, one end of the drum being of one radius and the other end being of a larger radius, the intermediate portion of the drum having varying portions of the surface thereof at each radius, whereby a cylindrical cam is provided, means for rotating the drum by the motor, circuit controlling means operated by the rotation of the cylindrical cam to be opened or closed as said means cooperates with one or the other of said surfaces, said circuit controlling means controlling the energy supply of the motor, and means for adjusting the circuit controlling means along the cam.

7. In combination, an electric motor, a rotary device, operating means for operating said device by said motor including a one-way clutch, means associated with said device for controlling current supply to said motor and manually operable means for rotating said device to electrically connect the circuit controlling means whereby the motor may be started.

8. A controller for an electric motor, comprising a circuit-closing device, manual means for periodically operating the circuit-closing device to energize the motor, and means operable by the motor irrespective of the operation of the manual means to periodically operate said circuit-closing device whereby the flow of energy to the motor is intermittent.

9. A controller for an electric motor, comprising a circuit-closing device, manual means for periodically operating the circuit-closing device to energize the motor, means operable by the motor irrespective of the operation of the manual means to periodically operate said circuit-closing device whereby the flow of energy to the motor is intermittent, and a fly-wheel carried by the motor shaft.

10. A controller for an electric motor, comprising a circuit-closing device, manual means for periodically operating the circuit-closing device to energize the motor, means operable by the motor irrespective of the operation of the manual means to periodically operate said circuit-closing device whereby the flow of energy to the motor intermittent, and means to vary the cycle.

11. A controller for an electric motor, comprising a circuit-closing device, manual means for periodically operating the circuit-closing device to energize the motor, means operable by the motor irrespective of the operation of the manual means to periodically operate said circuit-closing device whereby the flow of energy to the motor is intermittent, means to vary the cycle, and a flywheel carried by the motor shaft.

12. A controller for an electric motor, comprising a circuit-closing device, manual means for periodically operating the circuit-closing device to energize the motor, and means including a one-way clutch operable by the motor to periodically operate the circuit-closing device whereby the flow of energy to the motor is intermittent.

13. A controller for an electric motor, comprising a circuit-closing device, manual means for periodically operating the circuit-closing device to energize the motor, means including a one-way clutch operable by the motor to periodically operate the circuit-closing device whereby the flow of energy to the motor is intermittent, and means including a second one-way clutch to vary the cycle.

14. In combination, a cylindrical cam, the angular extent of the surface of which at different radii varies along the length of the cam, said cam being rotatably mounted, a circuit-closing device operable by the cam, means for moving said circuit-closing device and cam relative to one another in an axial direction whereby the flow of current may be varied, means including a one-way clutch for rotating said cam when said first-mentioned means is operated in one direction, an electric motor, a supply circuit therefor, under the control of said circuit-closing device whereby the motor may be started, and a reduction gear and one-way clutch mechanism intermediate the motor and cam whereby the cam may be rotated in one direction by the motor, said two clutches being opposed so that manual control of the circuit-closing device is independent of the motor control.

15. In combination, a cylindrical cam, the angular extent of the surface of which at different radii varies along the length of the cam, said cam being rotatably mounted, a circuit-closing device operable by the cam, means for moving said circuit-closing device and cam relative to one another in an axial direction whereby the flow of current may be varied, means including a one-way clutch for rotating said cam when said first-mentioned means is operated in one direction, an electric motor, a supply circuit therefor under the control of said circuit-closing device whereby the motor may be started, a reduction gear and one-way clutch mechanism intermediate the motor and cam whereby the cam may be rotated in one direction by the motor, said two clutches being opposed so that manual control of the circuit-closing device is independent of the motor control, and a speed-responsive mechanism cooperable with the circuit-closing device and first-mentioned means whereby the motor speed may be controlled within narrow limits irrespective of the load.

EDWARD VASSALLO HARTFORD.